United States Patent
Prasad et al.

(10) Patent No.: US 12,475,059 B2
(45) Date of Patent: Nov. 18, 2025

(54) MAINTAINING CONTIGUITY OF VIRTUAL TO PHYSICAL ADDRESS MAPPINGS TO EXPLOIT CONTIGUITY-AWARE TRANSLATION LOOK-ASIDE BUFFER HARDWARE

(71) Applicant: Intel Corporation, Santa Clara, CA (US)

(72) Inventors: Aravinda Prasad, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 662 days.

(21) Appl. No.: 17/825,977

(22) Filed: May 26, 2022

(65) Prior Publication Data

US 2022/0283954 A1    Sep. 8, 2022

(51) Int. Cl.
*G06F 12/1036*    (2016.01)

(52) U.S. Cl.
CPC .. *G06F 12/1036* (2013.01); *G06F 2212/2542* (2013.01); *G06F 2212/68* (2013.01)

(58) Field of Classification Search
CPC ......... G06F 12/1036; G06F 2212/2542; G06F 2212/68
See application file for complete search history.

(56) References Cited

U.S. PATENT DOCUMENTS

2021/0089467 A1* 3/2021 Prasad ................ G06F 12/0808

OTHER PUBLICATIONS

Alverti, Chloe, et al.,. "Enhancing and Exploiting Contiguity for Fast Memory Virtualization", 2020 ACM/IEEE 47th Annual International Symposium on Computer Architecture (ISCA), p. 515-528. (Year: 202).*

B. Pham, V. Vaidyanathan, A. Jaleel and A. Bhattacharjee, "CoLT: Coalesced Large-Reach TLBs," 2012 45th Annual IEEE/ACM International Symposium on Microarchitecture, Vancouver, BC, Canada, 2012, pp. 258-269, doi: 10.1109/MICRO.2012.32. (Year: 2012).*

(Continued)

*Primary Examiner* — Tim T Vo
*Assistant Examiner* — Christian Joseph O'Connell
(74) *Attorney, Agent, or Firm* — Jaffery Watson Hamilton & DeSanctis LLP

(57) ABSTRACT

Embodiments described herein are generally directed to maintaining contiguity of virtual to physical address mappings to exploit a contiguity-aware TLB. In an example, information regarding a migration set of one or more pages within a physical address space that have been identified for migration from a source tier of memory to a target tier of memory is received in which the physical address space comprises a first contiguous region of physical memory addresses and a VMA includes a second contiguous region of virtual memory addresses corresponding to the first contiguous region. It is determined whether the migration would break contiguity of a mapping maintained by a contiguity-aware TLB between pages of the first contiguous region and pages of the second contiguous region. Responsive an affirmative determination, discontinuities within the mapping resulting from the migration are minimized by intelligently increasing or decreasing the migration set.

20 Claims, 9 Drawing Sheets

(56) References Cited

OTHER PUBLICATIONS

Z. Yan, D. Nellans, D. Lustig and A. Bhattacharjee, "Translation Ranger: Operating System Support for Contiguity-Aware TLBs," 2019 ACM/IEEE 46th Annual International Symposium on Computer Architecture (ISCA), Phoenix, AZ, USA, 2019, pp. 698-710. (Year: 2019).*

Navarro, Juan, et al., "Practical, Transparent Operating System Support for Superpages", Nov. 2002 ACM SIGOPS Operating Systems Review 36(SI) (Year: 2002).*

Alverti, Chloe, et al., "Enhancing and Exploiting Contiguity for Fast Memory Virtualization", 2020 ACM/IEEE 47th Annual International Symposium on Computer Architecture (ISCA), p. 515-528.

Navarro, Juan, et al., "Practical, Transparent Operating System Support for Superpages", Nov. 2002 ACM SIGOPS Operating Systems Review 36(SI), 16 pages.

Pham, Binh, et al., "CoLT: Coalesced Large-Reach TLBs", Conference: Microarchitecture (MICRO), 2012 45th Annual IEEE/ACM International Symposium, 12 pages.

Yan, Zi, et al., "Translation Ranger: Operating System Support for Contiguity-Aware TLBs", ISCA '19, Jun. 22-26, 2019, Phoenix, AZ, USA, pp. 698-709.

* cited by examiner

MAINTAINING CONTIGUITY OF VIRTUAL TO PHYSICAL ADDRESS MAPPINGS TO EXPLOIT CONTIGUITY-AWARE TRANSLATION LOOK-ASIDE BUFFER HARDWARE

TECHNICAL FIELD

Embodiments described herein generally relate to the field of virtual to physical address translation and mapping. More particularly, embodiments relate to making efforts to maintain the contiguity of virtual to physical address mappings to exploit the efficiencies of a contiguity-aware translation look-aside buffer (TLB).

BACKGROUND

Virtual memory is a central abstraction used by modern operating systems to provide processes with a fictional view of a private, contiguous address space. With the assistance of hardware page table walkers, complex software-managed data structures, and modern TLBs, operating systems translate program code references to virtual memory to physical memory addresses. The Address translation wall is a situation where address translation overheads become a major performance bottleneck. This is especially the case with large memory systems potentially having terabytes of physical memory in which a significant portion of the memory accesses results in TLB misses requiring page table walks. Due to hardware resource constraints (both area and power), it is not feasible to increase the TLB caches to cover a significant part of such large physical memories.

Contiguity-aware TLBs mitigate the address translation wall by using a single TLB entry to store the address translation mapping of N contiguous regions. Hence a single entry has the flexibility to map any region of arbitrary size. For example, a single contiguity-aware TLB entry can map a 5 GB region, while it would otherwise require 1,310,720 TLB entries to map the region with normal TLBs when backed by 4K pages. Considering an L2 cache might be limited to 1,000 to 2,000 entries, the use of contiguity-aware TLBs can make a big difference.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
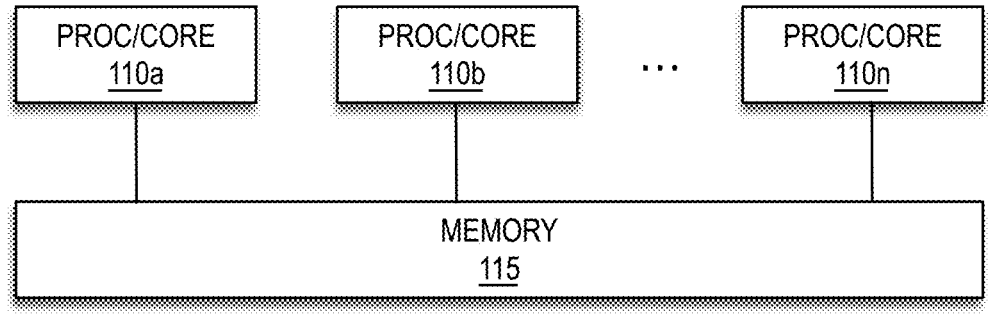
FIG. 1A is a block diagram illustrating a shared memory system having a uniform memory access (UMA) architecture according to some embodiments.

Embodiments described herein are generally directed to maintaining contiguity of virtual to physical address mappings to exploit a contiguity-aware TLB. Contiguity-aware TLBs are increasingly becoming popular and are being supported in various microprocessor offerings. In order to minimize the number of entries to be maintained by a contiguity-aware TLB as many of the virtual to physical address mappings (e.g., represented within page tables) as practical should be contiguous. Since operating systems manage such virtual to physical address mappings, in order to be effective, the hardware-supported contiguity-aware TLB feature is reliant on suitable support being provided by the operating system.

While previous approaches seek to exploit contiguity-aware TLB hardware by ensuring contiguity of the virtual to physical address mappings at the time of page allocation, such allocation-time contiguity is not sufficient since discontinuities may be introduced within the mappings due to various activities in the system. Notably, the contiguity of the virtual to physical address mappings can be broken even when the system is not under memory pressure. Examples of memory management activities, some of them are invoked frequently, that may break contiguity include NUMA balancing, hot/cold page promotion/demotion, memory compaction, and page reclamation.

NUMA balancing may involve the migration of a page that is frequently accessed by a remote CPU to a remote CPU's memory node to ensure future accesses are local. NUMA balancing breaks contiguity when a subset of pages in the contiguous mapping are accessed remotely. Similarly, in a tiered memory system in which hot and cold data are stored in different memory tiers (e.g., a hot-tier memory and a cold-tier memory, respectively), the promotion of hot pages from one memory tier to another or the demotion of cold pages from one memory tier to another can break contiguity when a subset of pages in the contiguous mappings are hot or cold.

Compaction is a technique that depends on page migration to reduce memory fragmentation. When a higher order page allocation (e.g., 2 MB) is not possible due to memory fragmentation, the operating system may compact the memory by moving a set of pages to a different physical memory location to defragment the memory. Pages corresponding to the contiguous virtual to physical mappings can be victims of compaction. Since, operating systems do not presently consider contiguity when pages are migrated to a different physical memory region, compaction may create discontinuities in the virtual to physical address mappings and increase the number of entries in contiguity-aware TLBs, thereby decreasing the effectiveness of contiguity-aware TLBs.

Most modern operating systems, implement some form of page reclamation to address memory pressure. In accordance with least-recently used (LRU) page reclamation, those pages that are least recently used are reclaimed to provide space within physical memory into which pages may be swapped in from a backing store (e.g., persistent storage). As the LRU pages in a contiguous virtual to physical mapping can be potential candidates for reclamations, when they are reclaimed, the contiguity is broken.

In view of the foregoing, various embodiments described herein seek to maintain contiguity of virtual to physical address mappings during page migration and page reclamation until it becomes impractical to do so by taking into consideration both page attributes (e.g., relative frequency of access (hot/cold) and relative timing of use) and virtual memory area (VMA) attributes (e.g., the physical pages referenced and their contiguity). For example, during page migration, information may be received regarding a set of one or more pages within a physical address space that have been identified for migration from a source tier of memory to a target tier of memory in which the physical address space comprises a first contiguous region of physical memory addresses and a virtual memory area (VMA) includes a second contiguous region of virtual memory addresses corresponding to the first contiguous region. A determination is made regarding whether the migration would break contiguity of a mapping maintained by a contiguity-aware TLB between pages of the first contiguous region and pages of the second contiguous region. Responsive an affirmative determination, the number of discontinuities within the mapping resulting from the migration may be minimized by (i) increasing the set by adding up to N pages of the first contiguous region to the set, or (ii) decreasing the set by removing up to M pages of the set from the set, where N represents a configurable or predetermined aggression factor and M represents a configurable or predetermined defensive factor.

In one embodiment, during page reclamation, an indication of a total number of pages desired to be reclaimed from a multiple VMAs of a shared memory system may be received in which a contiguity-aware TLB maintains respective sets of TLB entries mapping contiguous regions of virtual memory pages of the plurality of VMAs to corresponding contiguous regions of physical memory pages. A first stage of page reclamation identification may be performed by creating a reclamation set of pages based on a set of least-recently used (LRU) VMAs in which all physical memory pages associated with a given VMA of the set of LRU VMAs are within a list of LRU physical memory pages maintained by the shared memory system. Responsive to the first stage failing to identify a sufficient number of pages for reclamation to satisfy the total number of pages desired to be reclaimed (e.g., as a result of no LRU VMAs being found or having been exhausted), a second stage of page reclamation identification may be performed by adding pages to the reclamation set from the remaining VMAs of the multiple VMAs ("non-LRU VMAs") (i.e., those of the multiple VMAs that exclude LRU VMAs). The non-LRU VMAs may be prioritized based on their respective relative percentage of virtual memory pages corresponding to physical memory pages in the list of LRU physical memory pages.

In the following description, numerous specific details are set forth in order to provide a thorough understanding of example embodiments. It will be apparent, however, to one skilled in the art that embodiments described herein may be practiced without some of these specific details.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

An "embodiment" is intended to refer to an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

As used herein a "shared memory system" generally refers to a processor that implements a shared memory architecture in which multiple processor cores have access to a shared memory, a computer system that implements a shared memory architecture in which multiple processors of the computer system have access to a shared memory, or a system of multiple computer systems that implements a shared memory architecture in which each computer system has access to a shared memory. Examples of shared memory architectures include the uniform memory access (UMA) architecture and the non-uniform memory access (NUMA) architecture.

As used herein a "virtual memory area" or a "VMA" generally refers to a mechanism used by an operating system to keep track of memory mappings for a process or an application. A VMA may represent a processor-independent structure including of a number of pages that represent a virtually contiguous memory region within a virtual memory space. A non-limiting example of a VMA is the VMA structure (struct vm_area_struct) used by the Linux operating system.

Example Shared Memory Systems

Embodiments described herein embodiments described herein seek to maintain contiguity of virtual to physical address mappings during certain memory management activities (e.g., page migration and page reclamation) within a shared memory system. Two basic types of shared memory architectures are uniform memory access (UMA) and non-uniform memory access (NUMA) as described further below with reference to FIGS. 1A and 1B.

FIG. 1A is a block diagram illustrating a shared memory system 100 having a uniform memory access (UMA) architecture according to some embodiments. In the context of the present example, multiple processors or cores (e.g., proc/core 110a-n) in shared memory system 100 share physical memory (e.g., memory 115) uniformly. That is, the level of access and access time to a memory location within memory 115 is independent of which processor or core makes the request or which memory chip contains the data at issue. A common form of UMA architecture is a symmetric multiprocessor (SMP) machine that consists of multiple identical processors; however, in this example the UMA architecture is intended to also encompass a symmetric multicore processor (SMCP) consisting of multiple identical cores.

Figure 1B:
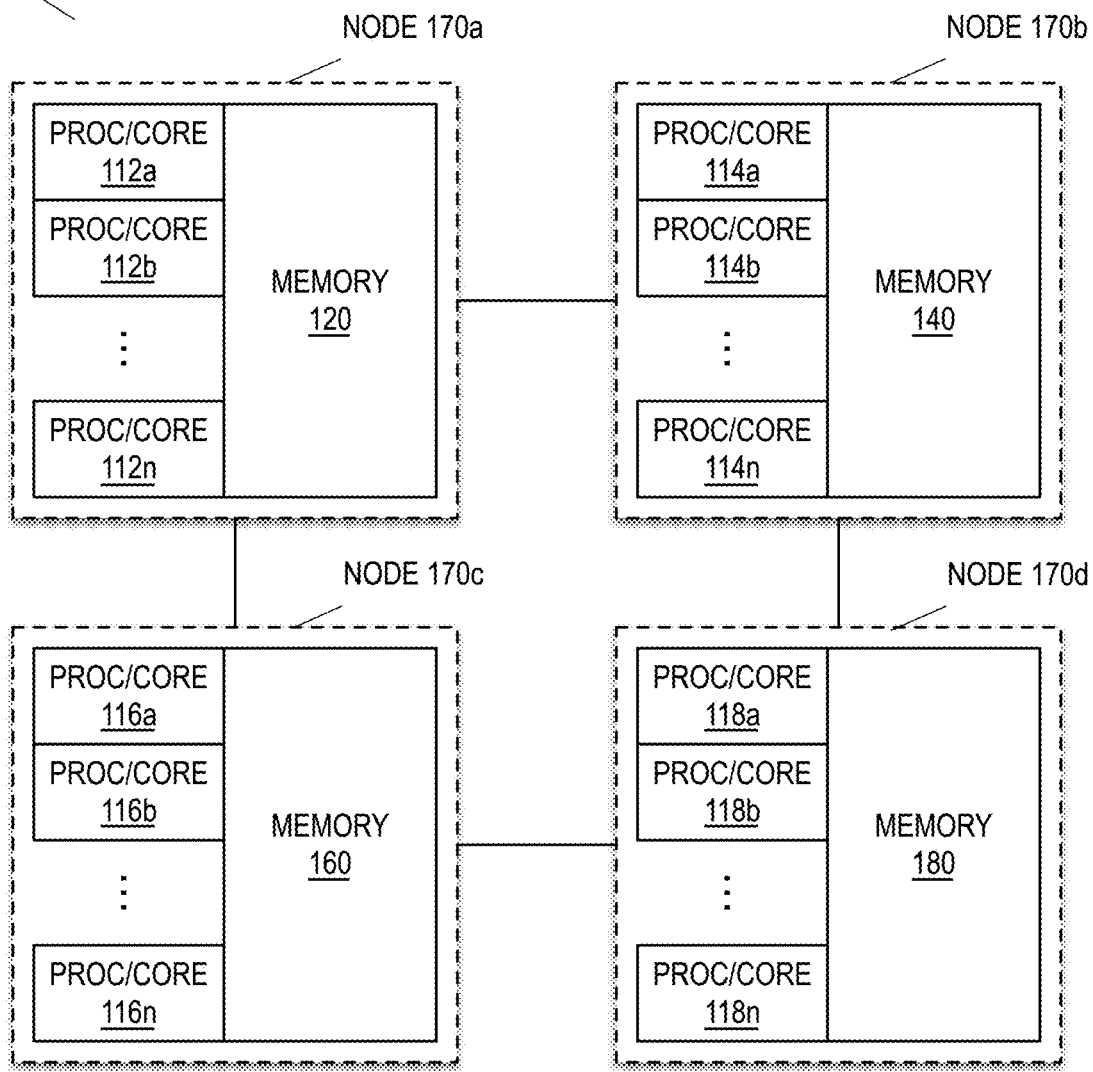
FIG. 1B is a block diagram illustrating a shared memory system having a non-uniform memory access (NUMA) architecture according to some embodiments.

FIG. 1B is a block diagram illustrating a shared memory system having a non-uniform memory access (NUMA) architecture according to some embodiments. In the context of the present example, the shared memory system 190 includes four NUMA nodes (e.g., nodes 170a-d), each including multiple processors or cores (e.g., proc/core 112a-n, 114a-n, 116a-n, and 118a-n, respectively) and local memory (e.g., memory 120, 140, 160, and 180, respectively). It is to be appreciated more or fewer nodes may be employed. A NUMA system is generally characterized by the fact that the access time to different memory locations might vary for processors or cores, as the case may be, of different NUMA nodes depending upon whether the memory location is within the local memory or a remote memory of another NUMA node. A common form of NUMA architecture is a machine made by inter-linking a number of SMPs (e.g., in the form described above with reference to FIG. 1); however, in this example the NUMA architecture is intended to also encompass a computer system made by inter-linking a number of SMCPs (e.g., in the form described above with reference to FIG. 1).

Example Tiered Memory

Figure 2:
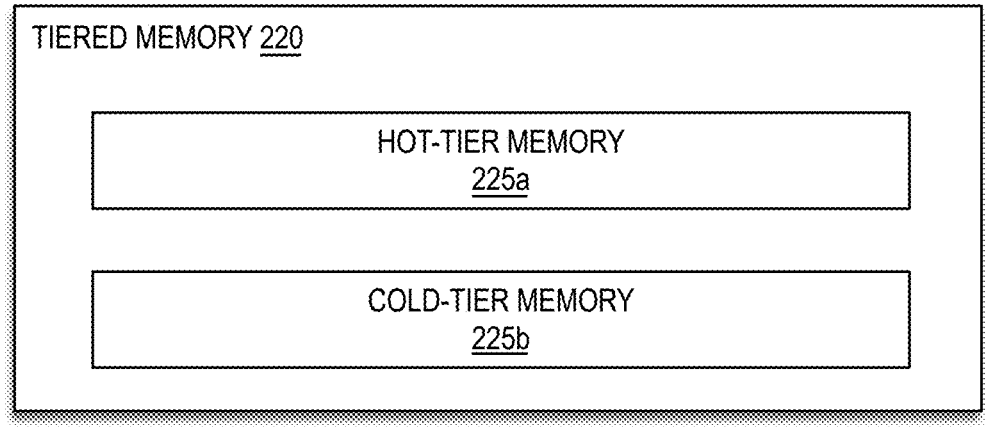
FIG. 2 is a block diagram illustrating a tiered memory according to some embodiments.

FIG. 2 is a block diagram illustrating a tiered memory 220 according to some embodiments. Tiered memories, such as tiered memory 220, represent a generalizable memory architecture that leverages the heterogeneous power-performance characteristics of each tier (e.g., hot-tier memory 225a and cold-tier memory 22b). Depending upon the particular implementation one or more of memories 115, 120, 140, 160, or 180 may represent tiered memory 200. Alternatively, a first set of one or more of memories 120, 140, 160, or 180 may represent the hot-tier memory 225a and a second set of one or more of memories 120, 140, 160, or 180 may represent the cold-tier memory 225b. In one embodiment, the cold-tier memory 225b is comprised of volatile random-access memory (RAM) (e.g., dynamic RAM (DRAM) or static RAM (SRAM) and the hot-tier memory 22n is comprised of a non-volatile (NV) memory (e.g., NVRAM (NVRAM), INTEL OPTANE persistent memory (PMem), or the like). In various embodiments, a shared memory system (e.g., shared memory system 100 or 190) may perform data tiering to shift or migrate data from the hot-tier memory 225ba to the cold-tier memory 225b as the state of the data changes dynamically (e.g., based on frequency of access per unit of time) from hot to cold and vice versa.

Example Contiguity-Aware TLB

Figure 3:
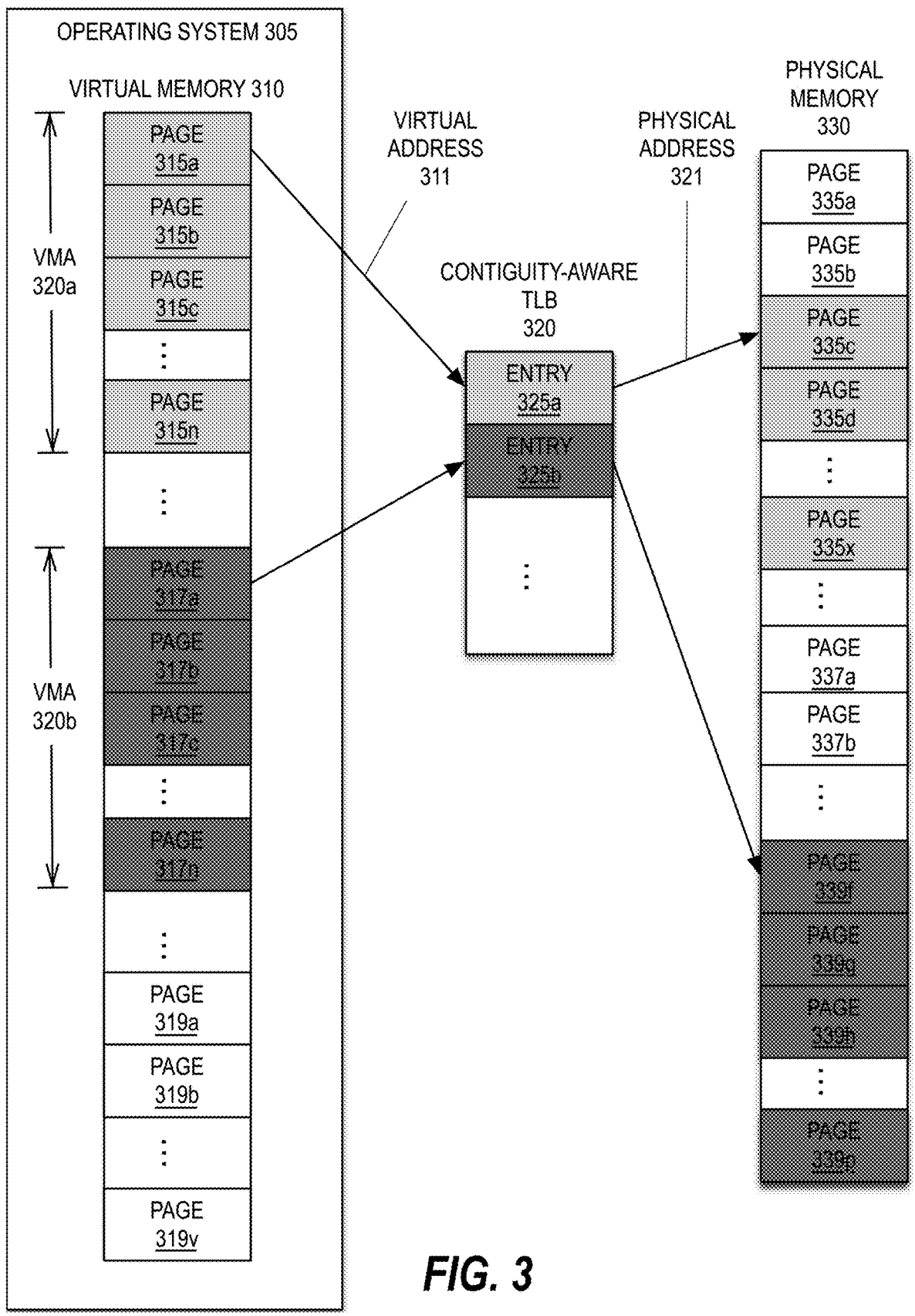
FIG. 3 is a block diagram illustrating the use of a contiguity-aware TLB to maintain mappings of sets of contiguous virtual memory pages to corresponding sets of contiguous physical memory pages according to some embodiments.

FIG. 3 is a block diagram illustrating the use of a contiguity-aware TLB 320 to maintain mappings of sets of contiguous virtual memory pages (e.g., pages 315a-n and pages 317a-n) to corresponding sets of contiguous physical memory pages (e.g., pages 335c-335x and pages 339f-p) according to some embodiments. In the context of the present example, an operating system 305 of a shared memory system (e.g., shared memory system 100 or 190) maintains information regarding VMAs (e.g., VMA 320a and VMA 320b) for respective processes (not shown) running within the operating system 305. In this example, each process has an associated VMA containing multiple contiguous virtual pages from a virtual memory 310 with pages 315a-315n, pages 317a-n, and pages 319a-x, among others. The virtual pages are mapped to corresponding physical pages within a physical memory 330 comprising pages 335a-x, 337a-b, 339f-p, among others, of the shared memory system via page tables (not shown) and a contiguity-aware TLB 320, which may be implemented within a memory management unit (not shown) of the shared memory system.

As a result of the operating system 305 ensuring contiguity of the virtual to physical address mappings at the time of page allocation, the virtual pages 315a-n of VMA 320a are mapped to a corresponding set of contiguous physical pages 335c-335x through a first set of contiguity-aware entries (in this case, including a single entry 325a due to the contiguity of pages 335c-x within physical memory 330) of contiguity-aware TLB 320, which outputs a corresponding physical address 321 for a given input virtual address 311. Similarly, the virtual pages 317a-n of VMA 320b are mapped to a corresponding set of contiguous physical pages 339f-p though a second set of contiguity-aware entries (in this case, including a single entry 325b due to the contiguity of pages 339f-p within physical memory 330).

Insufficiency of Allocation-Time Contiguity

Figure 4A:
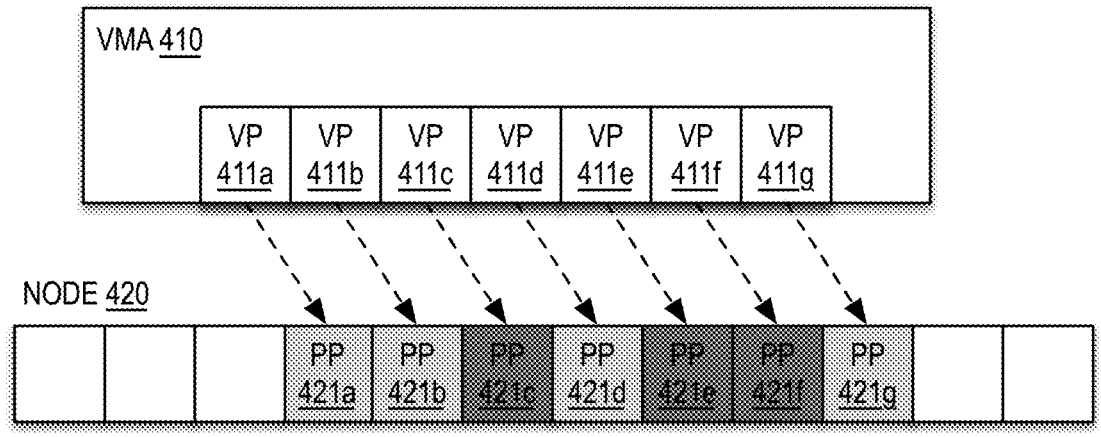
FIGS. 4A and 4B are block diagrams illustrating how allocation-time contiguity is not sustained when pages are migrated to a different NUMA node.
Figure 4B:
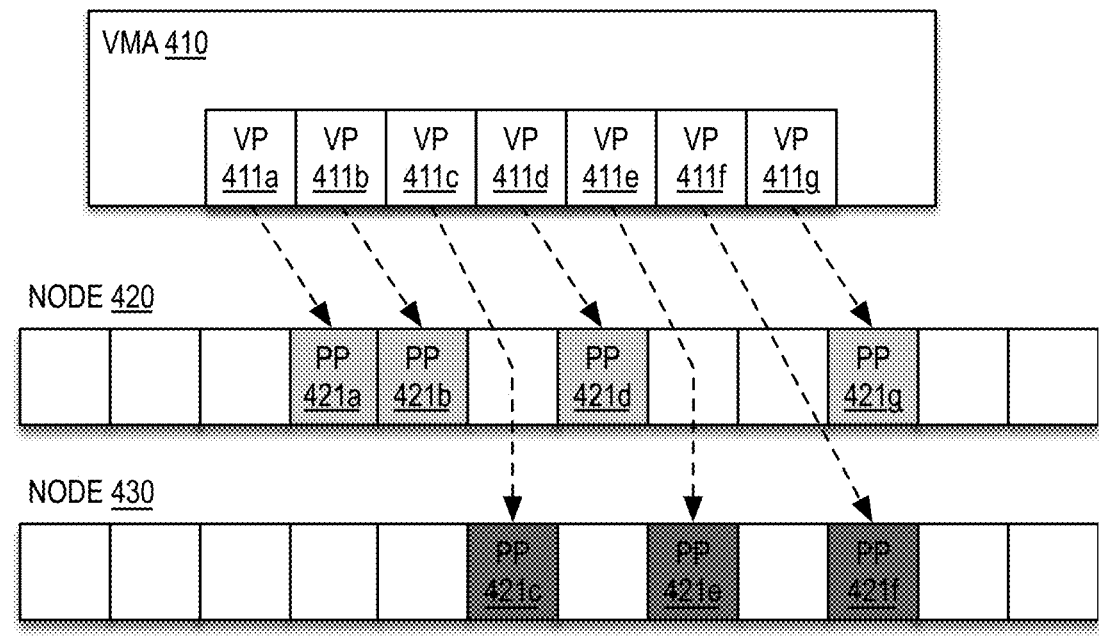

FIGS. 4A and 4B are block diagrams illustrating how allocation-time contiguity is not sustained when pages are migrated to a different NUMA node. While allocation-time contiguity of virtual to physical address mappings (such as that illustrated by FIG. 3) is helpful, it is not sufficient to maintain the efficiencies provided by a contiguity-aware TLB (e.g., contiguity-aware TLB 320) as discontinuities may be introduced within the mappings due to various memory management activities performed within the shared memory system. As noted above, examples of memory management activities that have a potential for breaking contiguity of virtual to physical address mappings include NUMA balancing, hot/cold page promotion/demotion, memory compaction, and page reclamation.

In the context of the present example, a VMA 410 of a process (not shown) running within an operating system (e.g., operating system 305) of a shared memory system (e.g., shared memory system 190) includes seven contiguous virtual pages (VPs 411*a-g*) that correspond to seven contiguous physical pages (PPs 421*a-g*) within a physical memory of node 420, which may represent one of the NUMA nodes of FIG. 1B. The dotted arrows represent the virtual to physical address memory mappings. Since the virtual to physical address memory mapping is contiguous from start to finish of VMA 410, the mapping may be maintained within a single entry of the contiguity-aware TLB.

FIG. 4A depicts a before state, prior to performance of a memory management activity, for example, migration relating to physical pages (i.e., PPs 421*c*, 421*e*, and 421*f*) with a dark gray background that represent physical pages identified by the operating system for migration. The physical pages (i.e., PPs 421*a-b*, 421*d*, and 421*g*) with a light gray background represent physical pages not subject to the migration. Without limitation, the migration may represent NUMA balancing of the physical pages to another NUMA node of a NUMA system as shown by FIG. 4B.

FIG. 4B depicts an after state, following performance of migration of physical pages (PPs 421*c*, 421*e*, and 421*f*) from node 420 to node 430. Since current operating systems do not ensure contiguity during page migration, in this example, the migrated physical pages (i.e., PPs 421*c*, 421*e*, and 421*f*) are shown with gaps in between to illustrate the worst case page migration scenario in which six separate "islands" or sets of one or more contiguous physical pages result from the page migration specified by the operating system. As an entry is maintained within a contiguity-aware TLB for each contiguous set of virtual to physical address mappings, in this after state, a contiguity-aware TLB maintaining virtual to physical address mappings for VMA 410 would now include six entries. Notably, even in the best case, in which PPs 421*e* and 421*f* end up being contiguous post migration, five separate "islands" or groupings of physical pages would remain for which the contiguity-aware TLB would contain five entries.

There are proposed approaches for performing recovery from lost contiguity, however, recovering from lost contiguity (after the damage has already been done) incurs significant overhead as it migrates pages which results in TLB shootdowns, memory bandwidth consumption, etc., and hence may impact the performance of all applications running on the shared memory system. Meanwhile, unlike the simplistic illustration provided with reference to FIGS. 4A and 4B, limited to a single VMA, a small set of pages, and a single memory management activity, in long-running systems, such as hypervisors, data center servers, and traditional web or database servers with uptimes of several months, the contiguity can be lost again and again over time due to ongoing memory management activities thus requiring ongoing efforts to recover from lost contiguity. Instead of reacting to problems arising from lost contiguity, various examples described herein attempt to proactively improve contiguity by carefully choosing groups of pages for migration and page candidates for reclamation as described further below with reference to FIGS. 4C, 4D, and 5.

Maintaining Contiguity During Page Migration

Figure 4C:
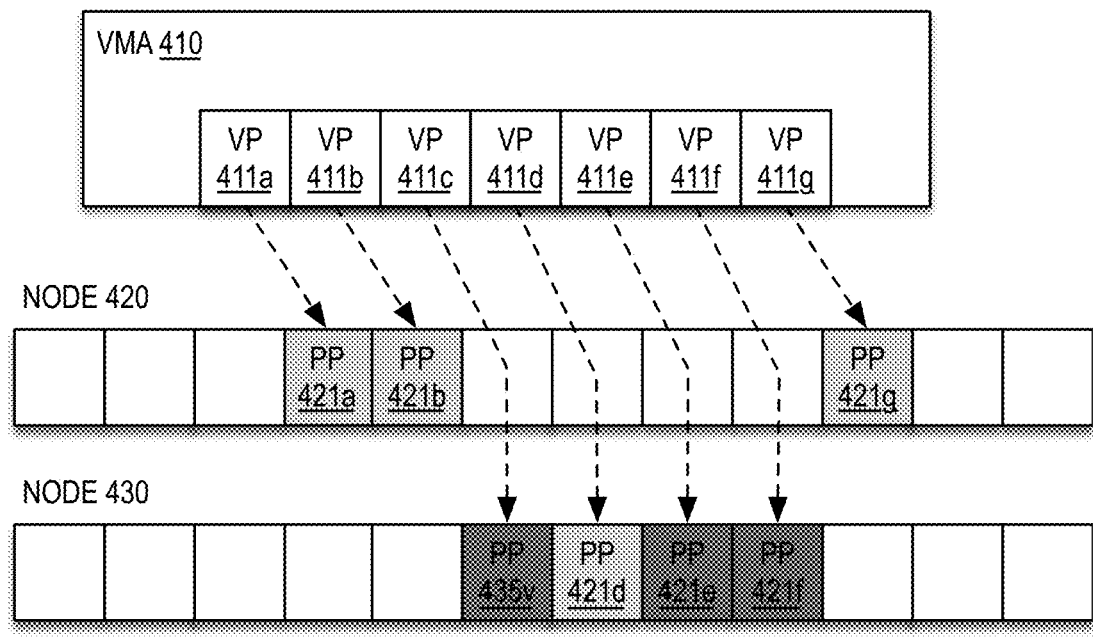
FIG. 4C is a block diagram illustrating an approach for maintaining contiguity when pages are migrated to a different NUMA node in an aggressive mode according to some embodiments.

FIG. 4C is a block diagram illustrating an approach for maintaining contiguity when pages are migrated to a different NUMA node in an aggressive mode according to some embodiments. Beginning from the same starting point as FIG. 4A in which physical pages (i.e., PPs 421*c*, 421*e*, and 421*f*) with a dark gray background have been initially identified for migration from node 420 to node 430, for example, by being included within a migration set, FIG. 4C depicts an after state following performance of migration of physical pages contained within the migration set after the migration set has been increased to lessen the introduction of discontinuities. For example, rather than proceeding with the page migration based on the migration set without regard for contiguity, the operating system may proactively take action to attempt to minimize the number of discontinuities resulting from the page migration by adding one or more pages not previously identified for migration to the migration set. As can be seen in the context of the present example, despite PP 421*d* not being among those physical pages initially identified for migration, when configured in an aggressive mode, the operating system may increase the set of pages identified for migration by adding one or more physical pages to the migration set to improve the resulting continuity post migration. In the context of the present example, the number of separate "islands" of sets of one or more contiguous physical pages resulting from the page migration has been reduced from a worst case of six to three. Further details regarding the proposed approach for maintaining contiguity during page migration are provided below with reference to FIG. 5.

Figure 4D:
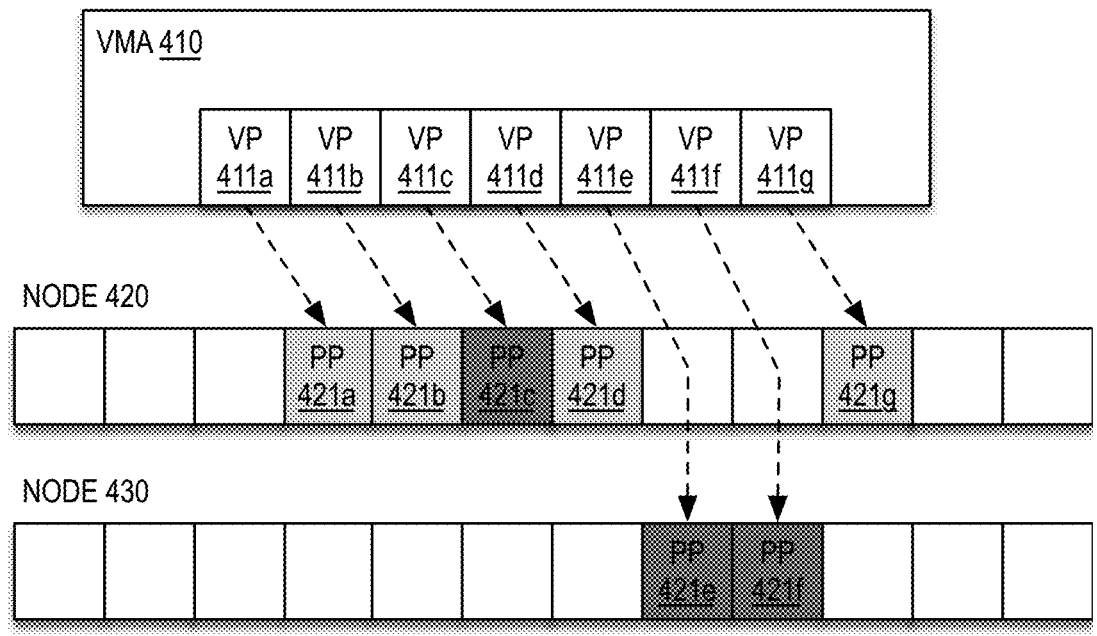
FIG. 4D is a block diagram illustrating an approach for maintaining contiguity when pages are migrated to a different NUMA node in a defensive mode according to some embodiments.

FIG. 4D is a block diagram illustrating an approach for maintaining contiguity when pages are migrated to a different NUMA node in a defensive mode according to some embodiments. Beginning from the same starting point as FIG. 4A in which physical pages (i.e., PPs 421*c*, 421*e*, and 421*f*) with a dark gray background have been initially identified for migration from node 420 to node 430, for example, by being included within a migration set, FIG. 4D depicts an after state following performance of migration of physical pages contained within the migration set after the migration set has been decreased to lessen the introduction of discontinuities. For example, rather than proceeding with the page migration based on the migration set without regard for contiguity, the operating system may proactively take action to attempt to minimize the number of discontinuities resulting from the page migration by removing one or more pages identified for migration from the migration set. As can be seen in the context of the present example, despite PP 421*c* being among those physical pages initially identified for migration, when configured in a defensive mode, the operating system may decrease the set of pages identified for migration by removing one or more physical pages from the migration set to improve the resulting continuity post migration. In the context of the present example, the number of separate "islands" of sets of one or more contiguous physical pages resulting from the page migration has been reduced from a worst case of six to three. Further details regarding the proposed approach for maintaining contiguity during page migration are provided below with reference to FIG. 5.

Figure 5:
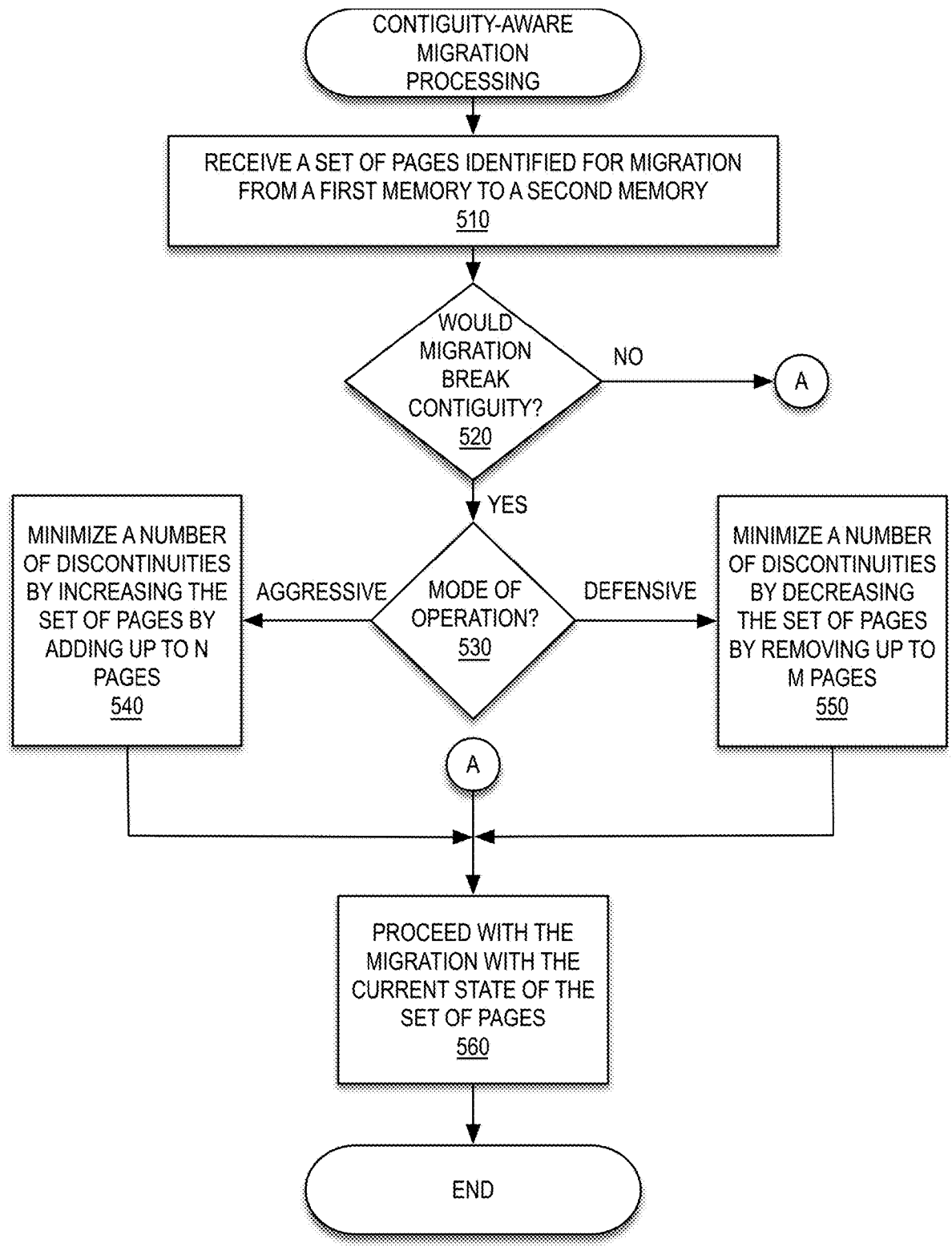
FIG. 5 is a flow diagram illustrating a set of operations for performing contiguity-aware migration processing according to some embodiments.

FIG. 5 is a flow diagram illustrating a set of operations for performing contiguity-aware migration processing according to some embodiments. The processing described with reference to FIG. 5 may be performed by a procedure or function call implemented by an operating system (e.g., operating system 305) of a shared memory system (e.g., shared memory system 100 or 190). For sake of convenient reference and without limitation, the procedure or function call may be referred to below as the contiguity optimizer.

At block 510, a set of pages identified for migration (a "migration set") from a first memory to a second memory is received. The pages within the migration set may belong to a particular VMA associated with an application or process running on a target NUMA node (e.g., one of nodes 112*a-n*, 114*a-n*, 116*a-n*, or 118*a-n*) of the shared memory system. The migration set may represent an initial or proposed set of pages to be migrated without consideration for contiguity of the virtual to physical address mappings that may ultimately result from performing a page migration involving the entirety of the migration set. The first memory and the second memory may be tiers of a tiered memory (e.g., tiered memory 220) of the shared memory system. The operating system may implement a data tiering algorithm to actively place data within a memory tier deemed to be most optimal for the present circumstances. For example, based on frequency of access within a particular time period, types of accesses and/or other factors, a given physical memory page may be designated as "hot" or "cold." The proposed migration of pages in the migration set may be part of the operating system's attempt to place hot pages into a memory tier that is most performant and/or closer to the target NUMA node, for example, that is actively using memory locations within the pages at issue. Alternatively, the proposed migration may be part of the operating system's attempt to place cold pages into a memory tier that is less performant.

At decision block 520, a determination is made regarding whether migration of the pages within the migration set would break contiguity of virtual to physical memory mappings for the particular VMA. If so, processing continues to decision block 530; otherwise, processing branches to block 560.

At decision block 530, a determination may be made regarding the mode of operation of the operating system with respect to modifying the migration set. In one embodiment, the operating system may implement two modes of operation, an aggressive mode and a defensive mode. Depending upon the particular implementation, the mode of operation may be specified by the caller of the contiguity optimizer or the mode of operation may be selected by the contiguity optimizer. The aggressive mode may be operable to aggressively migrate pages (subject to limitation) not identified as candidates for migration, whereas the defensive mode may be operable to defensively forego migration of pages (subject to limitation) identified as candidates for migration.

In one embodiment, the mode of operation may be selected based on source and/or destination memory tier associated with the page migration. For example, the aggressive mode may be enabled for page migration involving relocation of pages to a hot-tier memory (e.g., hot-tier memory 225*a*) and the defensive mode may be enabled for page migration involving relocation of pages to a cold-tier memory (e.g., cold-tier memory 225*b*). Alternatively or additionally, performance considerations of the shared memory system over a window of time may be taken into consideration. For example, when overall memory utilization meets a predetermined or configurable threshold, the aggressive mode may be enabled and the defensive mode may be enabled below the predetermined or configurable memory utilization threshold. Alternatively or additionally, memory utilization of a particular memory tier of the tiered memory may be taken into consideration. Similarly, the aggression factor (M) and/or the defensive factor (N) may be dynamically tuned based on various system-level and/or local NUMA node characteristics (e.g., memory and/or CPU usage). In the context of the present example, if the specified or selected mode of operation is the aggressive mode, processing continues with block 540; otherwise, if the specified or selected mode of operation is the defensive mode, processing branches to block 550.

At block 540, a number of discontinuities resulting from performing a page migration on the basis of the current migration set is attempted to be minimized by increasing the pages included within the migration set. In one embodiment, the attempt at minimizing the discontinuities may be performed up to a point at which it is deemed impractical to do so, for example, based on an aggression factor. In one embodiment, the aggression factor represents an upper limit on the number of pages (N), that may be added to the migration set to seek to maintain continuity of the virtual to physical address mappings for the VMA at issue.

At block 540, a number of discontinuities resulting from performing a page migration on the basis of the current migration set is attempted to be minimized by decreasing the pages included within the migration set. In one embodiment, the attempt at minimizing the discontinuities may be performed up to a point at which it is deemed impractical to do so, for example, based on a defensive factor. In one embodiment, the defensive factor represents an upper limit on the number of pages (M), that may be removed from the migration set to seek to maintain continuity of the virtual to physical address mappings for the VMA at issue.

At block 560, the page migration proceeds on the basis on the current state of the migration set as modified by the contiguity optimizer. A pseudo code representation of a contiguity-aware migration process that makes use of the aggressive mode and defensive mode in accordance with an embodiment is presented below.

Algorithm #1—Contiguity-Aware Migration

For purposes of completeness, a non-limiting pseudo code example of a contiguity-aware migration algorithm is presented below:

```
1.  Input: A set of pages identified for migration that belong to the same
    VMA, target NUMA node.
2.  pages_to_migrate = the input set of pages identified for migration
3.  pages_nomigrate – VMA pages not identified for migration
4.  if(target_NUMA_node is hot-tier memory)
5.  {
6.    if(pages in pages_to_migrate breaks contiguity)
7.    {
8.      - Pick N pages from pages_nomigrate to maximize the
          contiguity after migration. Where N is an
          aggression factor
9.      - Add these N pages to pages_to_migrate set
10.   }
11. }
12. else /* target NUNA node is cold-tier memory */
13. {
14.   if(pages in pages_to_migrate breaks contiguity)
15.   {
16.     - Remove M pages from pages_to_migrate to maximize the
          contiguity. Where M is a defensive factor
17.     - Add these M pages to pages_nomigrate by removing from
          pages_to_migrate set
18.   }
19. }
20. }
21. }
22. perform_migration(pages_to_migrate)
```

Maintaining Contiguity During Page Reclamation

Figure 6:
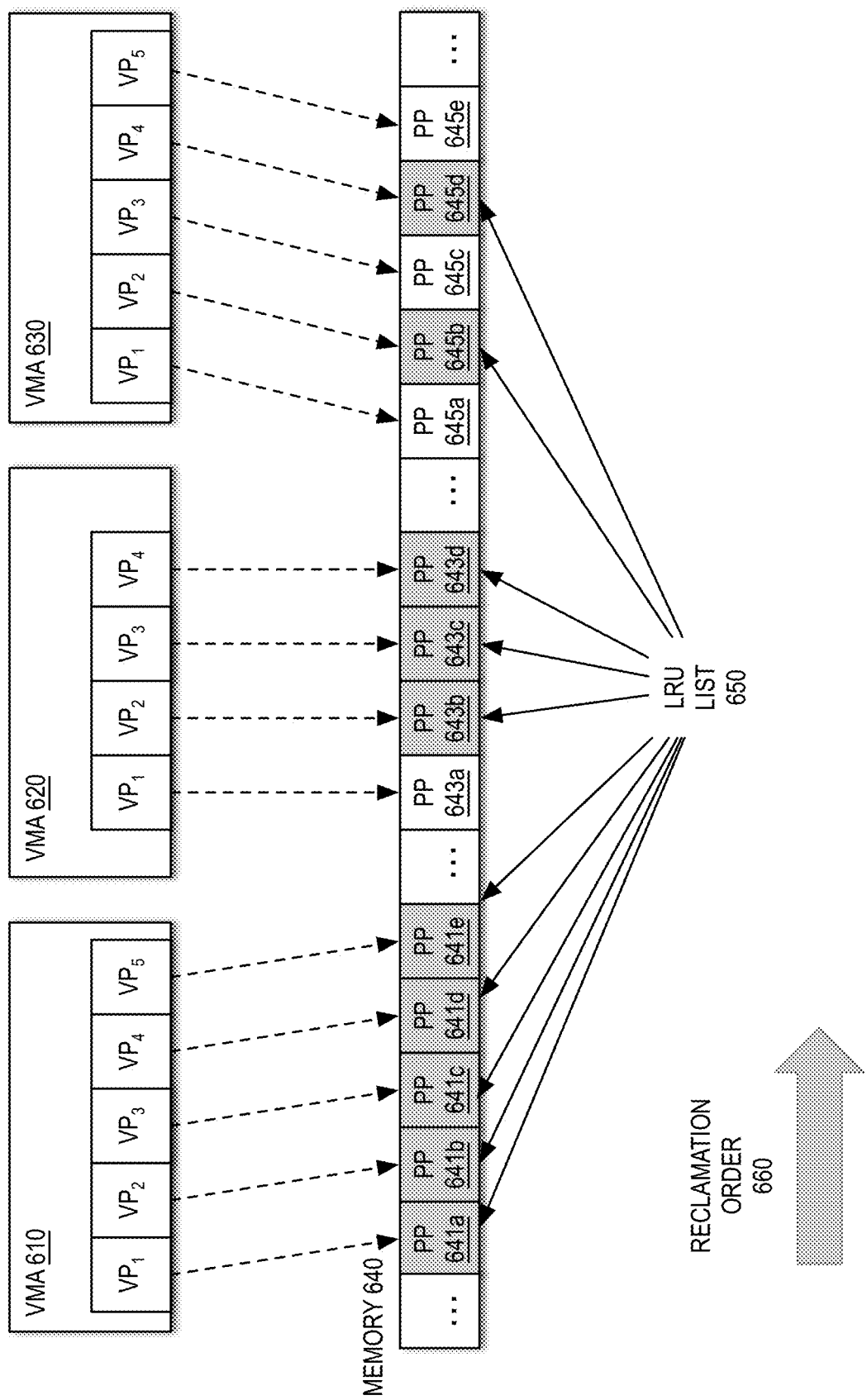
FIG. 6 is a block diagram illustrating an approach for maintaining contiguity when pages are reclaimed according to some embodiments.

FIG. 6 is a block diagram illustrating an approach for maintaining contiguity when pages are reclaimed according to some embodiments. In the context of the present example, a shared memory system (e.g., shared memory system 100 or 190) is assumed to include processes making use of VMA 610, 620, and 630, respectively. As above, the dotted arrows represent the virtual to physical address memory mappings and are currently assumed to be contiguous. It is further assumed an operating system (e.g., operating system 205) maintains information regarding least-recently used physical memory pages of a memory 640 (which may be analogous to memory 115, 120, 140, 160, or 180) in the form of an LRU list 650. Memory 640 is shown including physical pages PP 641a-e, 643a-n, 645a-d, among others (not shown). Physical pages (i.e., PP 641a-e, 643b-n, 645b, and 645d) with a light gray background represent physical pages in the LRU list 650, whereas physical pages (i.e., PP 643a, 645a, 645c, and 645e) with a white background represent active physical pages.

At present, when there is a need to perform page reclamation, for example, due to memory pressure, existing operating systems may select LRU pages for reclamation from any or all of VMA 610, 620, and 630 based on the order of the pages in the LRU list 650. If the LRU pages from VMA 630 are on top of the LRU list 650, then reclaiming them breaks contiguity and increases the TLB entries for a contiguity-aware TLB containing the virtual to physical address mappings for VMA 630 from one to three as a result.

Rather than reclaiming pages based on the order in which they are stored within the LRU list 650, in one embodiment, pages are identified for reclamation first from least-recently used VMAs (i.e., a VMA with all of its virtual pages corresponding to physical pages in the LRU list 650). If additional pages are to be reclaimed after exhausting all LRU VMAs in the system or if no LRU VMAs exist in the system, another round of reclamation page identification may be performed by prioritizing the non-LRU VMAs, for example, in accordance with their respective percentage of virtual pages corresponding to physical pages in the LRU list 650. As such, in this example, assuming a goal of reclaiming six physical pages, PP 641a-e would first be identified for reclamation as VMA 610 is an LRU VMA, then an additional physical page of those to which the virtual pages of VMA 620 map would be identified as between VMA 620 and VMA 630, VMA 620 has the highest percentage of virtual pages corresponding to physical pages that are in the LRU list 650. Additionally, for each VMA, the order (i.e., from lower to higher addresses (left to right) or from higher to lower addresses (right to left)) in which physical pages are selected for reclamation may be chosen to ensure maximum contiguity for the rest of the VMA pages. In the context of the present example, the reclamation order 660 is from lower to higher addresses.

Figure 7:
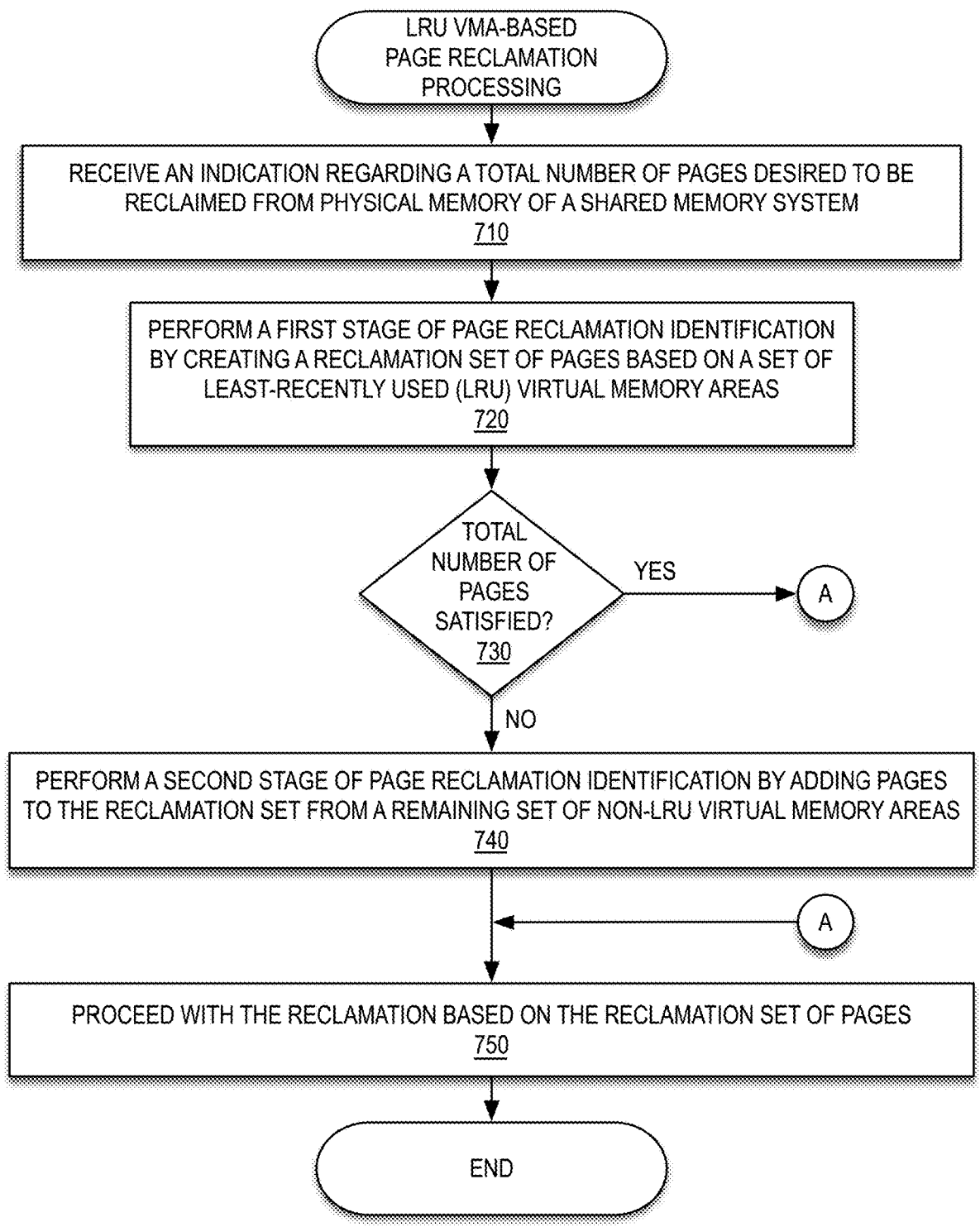
FIG. 7 is a flow diagram illustrating a set of operations for performing least-recently used (LRU) virtual memory area (VMA)-based page reclamation processing according to some embodiments.

FIG. 7 is a flow diagram illustrating a set of operations for performing least-recently used (LRU) virtual memory area (VMA)-based page reclamation processing according to some embodiments. The processing described with reference to FIG. 7 may be performed by a procedure or function call implemented by an operating system (e.g., operating system 305) of a shared memory system (e.g., shared memory system 100 or 190).

At block 710, an indication regarding a total number of pages desired to be reclaimed from physical memory of the shared memory system is received. For example, responsive to memory pressure, a procedure or function of the operating system may determine the number of pages to be reclaimed. Based on memory locations within physical memory (e.g., memory 640) that are accessed by applications or processes running within the operating system, the operating system may maintain a list of LRU physical pages (e.g., LRU list 650).

At block 720, a first stage of page reclamation identification may be performed by creating a reclamation set of pages based on a set of LRU VMAs within the shared memory system. For example, those of the VMAs within the shared memory system may be evaluated to determine the percentage of their virtual pages map to physical pages within the list of LRU physical pages. In one embodiment, while the total number of pages desired to be reclaimed remains unsatisfied, LRU VMAs (i.e., a VMA, such as VMA 610, for which 100% of the virtual pages map to physical pages within the list of LRU physical pages) may be processed one by one, processing the physical pages to which the virtual pages of the current LRU VMA maps from lower to higher addresses or from higher to lower addresses and adding them to a reclamation page set.

At decision block 730, a determination is made regarding whether the total number of pages desired to be reclaimed has been satisfied based on the first stage. If so processing branches to block 750; otherwise, processing continues with block 740.

At block 740, an insufficient number of physical pages were identified for reclamation during the first stage of reclamation page identification either as a result of the LRU VMAs within the shared memory system having been exhausted or due to no LRU VMAs having been identified within the shared memory system. In either case, a second stage of page reclamation identification is now performed by adding pages to the reclamation set from the remaining set of non-LRU VMAs (i.e., VMAs for which less than 100% of their virtual pages map to physical pages within the list of LRU physical pages). In one embodiment, the non-LRU VMAs are prioritized and processed in order of their respective percentage of virtual pages corresponding to physical pages in the LRU list 650 from highest to lowest. For example, in the context of FIG. 6, VMA 620, in which n−1 of n of its virtual pages correspond to physical pages in the LRU list 650, may be processed during the second stage before resorting to VMA 630, in which 2 of 5 (or 40%) of its virtual pages correspond to physical pages in the LRU list 650. Furthermore, those of the physical pages in the list of LRU physical pages to which the virtual memory pages of VMA at issue map may be selected for reclamation in a particular order so as to create a minimum number of discontinuities in the virtual to physical address mapping. In one embodiment, an approach similar to that described with reference to FIG. 5 and Algorithm #1 may be used to identify pages to be included within the reclamation set while sustaining contiguity. For example, referring back to FIG. 6, assuming six pages are desired to be reclaimed, after identifying PP 641a-e for reclamation during the first stage, PP 643d would be selected next during the second stage as its reclamation would not break the contiguity of the virtual to physical address mapping of VMA 620, whereas reclamation of PP 643b or 643c would break the contiguity. Continuing with this example, if instead, seven or more physical pages are desired to be reclaimed, the physical pages to which the virtual pages of VMA 620 map would continue to be processed in order of highest to lowest address (right to left) or from lower to highest order (left to right) until the total number of pages are satisfied or until all of the physical pages to which the virtual pages of VMA 620 map have been identified for reclamation. In the case of the latter, the second stage would continue reclamation page identification with reference to the physical pages to which the virtual pages of VMA 630 map in the same manner.

At block 750, the page reclamation proceeds based on the reclamation set of pages identified during the first stage of page reclamation and/or second stage of page reclamation. A pseudo code representation of an LRU VMA-based page reclamation process in accordance with an embodiment is presented below.

Algorithm #2—LRU VMA-Based Page Reclamation

For purposes of completeness, a non-limiting pseudo code example of an LRU VMA-based page reclamation algorithm is presented below:

```
1.  Input: A number of pages to reclaim(total_pages)
2.  pages_to_reclaim = NULL
3.  for each LRU VMA in the system
4.  {
5.      /* VMAs with all pages in LRU list */
6.      target_pages = pick pages from lower to higher address
7.      total_pages = total_pages - # of target_pages
8.      add target_pages to pages_to_reclaim list
9.      if (total_pages == 0)
10.     {
11.         reclaim_pages(pages_to_reclaim)
12.         return;
13.     }
14. }
15. /* LRU VMAs are either not found or exhausted */
16. for each VMA in the system with highest percentage of LRU pages
17. {
18.     target_pages = pick the maximum set of pages such that the TLB
19.         entries required to cover the VMA does not increase by a
20.         factor of "C" after reclamation
21.     total_pages = total_pages - # of target_pages
22.     add target_pages to pages_to_reclaim list
23.     if (total_pages == 0)
24.     {
25.         reclaim_pages(pages_to_reclaim)
26.         return;
27.     }
28. }
```

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

Example Computer System

Figure 8:
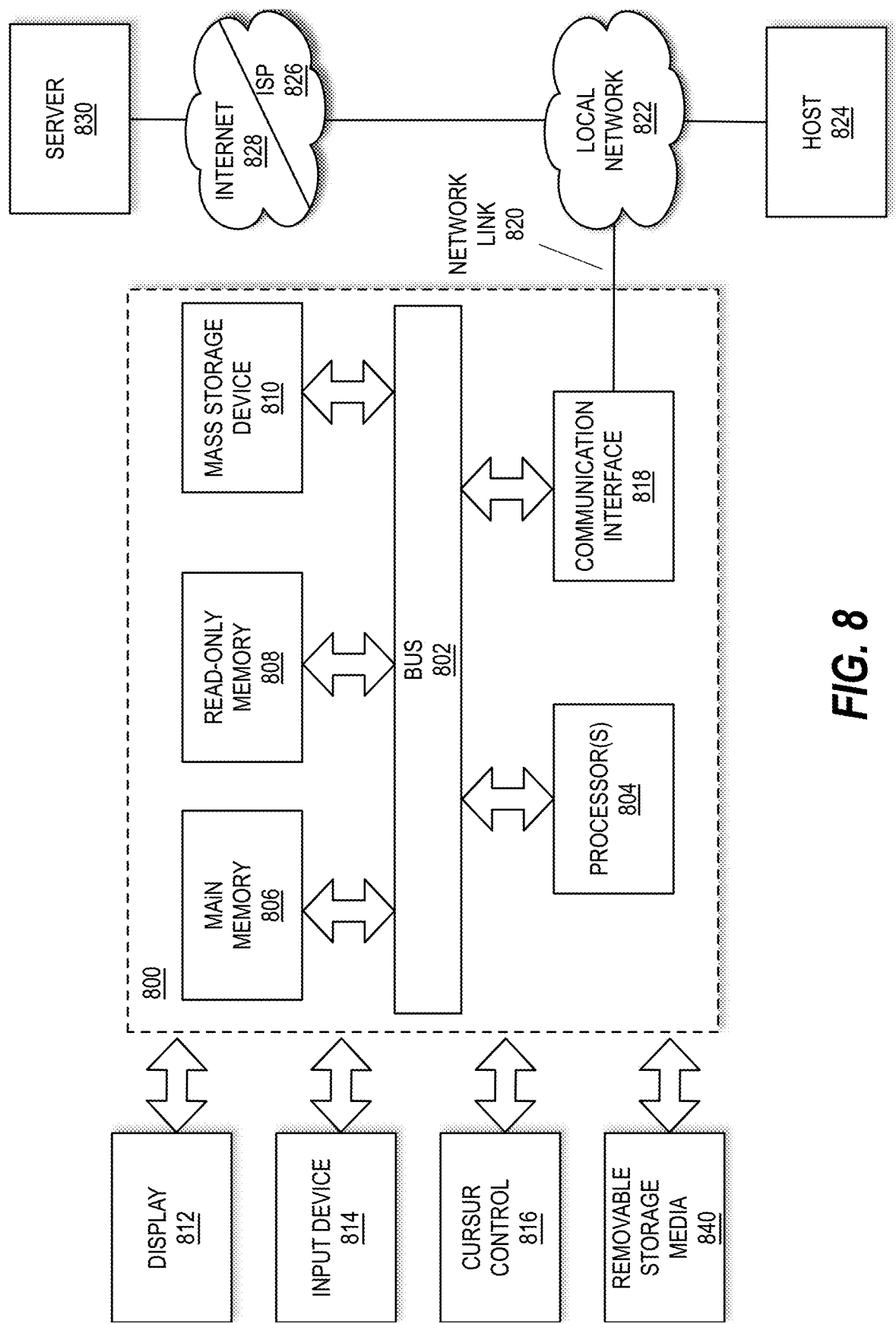
FIG. 8 is an example of a computer system in which some embodiments may be employed.

FIG. 8 is an example of a computer system 800 according to some embodiments. Computer system may represent a node (e.g., one of nodes 170a-d) of a shared memory system (e.g., shared memory system 190) or may represent a machine in which one or more SMCPs are implemented. Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., one or more hardware processors 804) coupled with bus 802 for processing information.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes interface circuitry 818 coupled to bus 802. The interface circuitry 818 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. As such, interface 818 may couple the processing resource in communication with one or more discrete accelerators 805.

Interface 818 may also provide a two-way data communication coupling to a network link 820 that is connected to a local network 822. For example, interface 818 may be an integrated services digital network (ISDN) card, cable modem, satellite modem, or a modem to provide a data communication connection to a corresponding type of telephone line. As another example, interface 818 may be a local area network (LAN) card to provide a data communication connection to a compatible LAN. Wireless links may also be implemented. In any such implementation, interface 818 may send and receive electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

Many of the methods may be described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that include a non-transitory machine-readable medium storing instructions, which when executed by a processing resource of a monitor node of a shared memory system cause the shared memory system to: determine whether migration of a set of one or more pages within a first continuous region of physical memory addresses of a physical address space from a source tier of memory to a target tier of memory, would break contiguity of a mapping maintained by a contiguity-aware translation lookaside buffer (TLB) between pages of the first contiguous region and a second contiguous region of a virtual memory area (VMA) corresponding to the first contiguous region; and responsive an affirmative determination, minimize a number of discontinuities within the mapping resulting from the migration by (i) increasing the set by adding up to N pages of the first contiguous region to the set, or (ii) decreasing the set by removing up to M pages of the set from the set.

Example 2 includes the subject matter of Example 1, wherein the instructions further cause the shared memory system to select between said increasing and decreasing based on the target tier of memory.

Example 3 includes the subject matter of Examples 1-2, wherein the source tier of memory comprises a non-volatile memory in which cold data is stored, wherein the target tier of memory comprises a volatile memory in which hot data is stored, and wherein the migration represents a promotion of hot pages.

Example 4 includes the subject matter of Examples 1-3, wherein the shared memory system comprises a non-uniform memory access (NUMA) system, wherein the source tier of memory is associated with a remote node of the NUMA system, wherein the target tier of memory is associated with a local node of the NUMA system, and wherein the migration is part of a balancing of pages within the NUMA system.

Example 5 includes the subject matter of Examples 1-4, wherein N represents a dynamically configurable or predetermined aggression factor and M represents a dynamically configurable or predetermined defensive factor.

Some embodiments pertain to Example 6 that includes a non-transitory machine-readable medium storing instructions, which when executed by a processing resource of a monitor node of a shared memory system cause the shared memory system to: receive an indication of a total number of pages desired to be reclaimed from a plurality of virtual memory areas (VMAs) of the shared memory system, wherein a contiguity-aware translation lookaside buffer (TLB) maintains respective sets of TLB entries mapping contiguous regions of virtual memory pages of the plurality of VMAs to corresponding contiguous regions of physical memory pages; perform a first stage of page reclamation identification by creating a reclamation set of pages based on a set of least-recently used (LRU) VMAs in which all physical memory pages associated with a given VMA of the set of LRU VMAs are within a list of LRU physical memory pages maintained by the shared memory system; and responsive to the first stage failing to satisfy the total number of pages, perform a second stage of page reclamation identification by adding pages to the reclamation set from a remaining set of VMAs of the plurality of VMAs that exclude the LRU VMAs, wherein the remaining set of VMAs are prioritized based on their respective relative percentage of virtual memory pages corresponding to physical memory pages in the list.

Example 7 includes the subject matter of Example 6, wherein the first stage of page reclamation identification comprises while a size of the reclamation set is less than the total number of pages, for each VMA of the set of LRU VMAs: selecting a page for inclusion within the reclamation set by sequentially traversing physical memory pages associated with the VMA; and adding the selected page to the reclamation set.

Example 8 includes the subject matter of Examples 6-7, wherein the second stage of page reclamation identification comprises while the size of the reclamation set is less than the total number of pages, for each VMA of the remaining set of VMAs: identifying a maximum set of physical memory pages associated with the VMA that may be reclaimed without increasing a number of TLB entries of the set of TLB entries maintained for the VMA beyond a threshold; and adding the identified maximum set of physical memory pages to the reclamation set.

Example 9 includes the subject matter of Examples 6-8, wherein the indication of the total number of pages is received responsive to memory pressure associated with the shared memory system.

Example 10 includes the subject matter of Examples 6-9, wherein the indication of the total number of pages is received during a defragmentation process performed by the shared memory system.

Some embodiments pertain to Example 11 that includes a method comprising: receiving information regarding a set of one or more pages within a physical address space that have been identified for migration from a source tier of memory to a target tier of memory, wherein the physical address space comprises a first contiguous region of physical memory addresses, and wherein a virtual memory area (VMA) includes a second contiguous region of virtual memory addresses corresponding to the first contiguous region; determining whether the migration would break contiguity of a mapping maintained by a contiguity-aware translation lookaside buffer (TLB) between pages of the first contiguous region and pages of the second contiguous region; and responsive an affirmative determination, minimizing a number of discontinuities within the mapping resulting from the migration by (i) increasing the set by adding up to N pages of the first contiguous region to the set, or (ii) decreasing the set by removing up to M pages of the set from the set.

Example 12 includes the subject matter of Example 11, further comprising selecting between said increasing and decreasing based on the target tier of memory.

Example 13 includes the subject matter of Examples 11-12, wherein the source tier of memory comprises a non-volatile memory in which cold data is stored, wherein the target tier of memory comprises a volatile memory in which hot data is stored, and wherein the migration represents a promotion of hot pages.

Example 14 includes the subject matter of Examples 11-13, wherein the source tier of memory is associated with a remote node of a non-uniform memory access (NUMA) system, wherein the target tier of memory is associated with a local node of the NUMA system, and wherein the migration is part of a balancing of pages within the NUMA system.

Example 15 includes the subject matter of Examples 11-14, wherein N represents a dynamically configurable or predetermined aggression factor and M represents a dynamically configurable or predetermined defensive factor.

Some embodiments pertain to Example 16 that includes a method comprising: receiving an indication of a total number of pages desired to be reclaimed from a plurality of virtual memory areas (VMAs) of a shared memory system, wherein a contiguity-aware translation lookaside buffer (TLB) maintains respective sets of TLB entries mapping contiguous regions of virtual memory pages of the plurality of VMAs to corresponding contiguous regions of physical memory pages; performing a first stage of page reclamation identification by creating a reclamation set of pages based on a set of least-recently used (LRU) VMAs in which all physical memory pages associated with a given VMA of the set of LRU VMAs are within a list of LRU physical memory pages maintained by the shared memory system; and responsive to the first stage failing to satisfy the total number of pages, performing a second stage of page reclamation identification by adding pages to the reclamation set from a remaining set of VMAs of the plurality of VMAs that exclude the LRU VMAs, wherein the remaining set of VMAs are prioritized based on their respective relative percentage of virtual memory pages corresponding to physical memory pages in the list.

Example 17 includes the subject matter of Example 16, wherein the first stage of page reclamation identification comprises while a size of the reclamation set is less than the total number of pages, for each VMA of the set of LRU VMAs: selecting a page for inclusion within the reclamation set by sequentially traversing physical memory pages associated with the VMA; and adding the selected page to the reclamation set.

Example 18 includes the subject matter of Examples 16-17, wherein the second stage of page reclamation identification comprises while the size of the reclamation set is less than the total number of pages, for each VMA of the remaining set of VMAs: identifying a maximum set of physical memory pages associated with the VMA that may be reclaimed without increasing a number of TLB entries of the set of TLB entries maintained for the VMA beyond a threshold; and adding the identified maximum set of physical memory pages to the reclamation set.

Example 19 includes the subject matter of Examples 16-18, wherein the indication of the total number of pages is received responsive to memory pressure associated with the shared memory system.

Example 20 includes the subject matter of Examples 16-19, wherein the indication of the total number of pages is received during a defragmentation process performed by the shared memory system.

Some embodiments pertain to Example 21 that includes a shared memory system comprising: a processing resource; and a machine-readable medium, coupled to the processing resource, having stored therein instructions, which when executed by the processing resource the shared memory system to: receive information regarding a set of one or more pages within a physical address space that have been identified for migration from a source tier of memory to a target tier of memory, wherein the physical address space comprises a first contiguous region of physical memory addresses, and wherein a virtual memory area (VMA) includes a second contiguous region of virtual memory addresses corresponding to the first contiguous region; determine whether the migration would break contiguity of a mapping maintained by a contiguity-aware translation lookaside buffer (TLB) between pages of the first contiguous region and pages of the second contiguous region; and responsive an affirmative determination, minimize a number of discontinuities within the mapping resulting from the migration by (i) increasing the set by adding up to N pages of the first contiguous region to the set, or (ii) decreasing the set by removing up to M pages of the set from the set.

Example 22 includes the subject matter of Example 21, wherein the instructions further cause the shared memory system to select between said increasing and decreasing based on the target tier of memory.

Example 23 includes the subject matter of Examples 21-22, wherein the source tier of memory comprises a non-volatile memory in which cold data is stored, wherein the target tier of memory comprises a volatile memory in which hot data is stored, and wherein the migration represents a promotion of hot pages.

Example 24 includes the subject matter of Examples 21-23, wherein the shared memory system comprises a non-uniform memory access (NUMA) system, wherein the source tier of memory is associated with a remote node of the NUMA system, wherein the target tier of memory is associated with a local node of the NUMA system, and wherein the migration is part of a balancing of pages within the NUMA system.

Example 25 includes the subject matter of Examples 21-24, wherein N represents a dynamically configurable or predetermined aggression factor and M represents a dynamically configurable or predetermined defensive factor.

Some embodiments pertain to Example 26 that includes a shared memory system comprising: a processing resource; and a machine-readable medium, coupled to the processing resource, having stored therein instructions, which when executed by the processing resource the shared memory system to: receive an indication of a total number of pages desired to be reclaimed from a plurality of virtual memory areas (VMAs) of a shared memory system, wherein a contiguity-aware translation lookaside buffer (TLB) maintains respective sets of TLB entries mapping contiguous regions of virtual memory pages of the plurality of VMAs to corresponding contiguous regions of physical memory pages; perform a first stage of page reclamation identification by creating a reclamation set of pages based on a set of least-recently used (LRU) VMAs in which all physical memory pages associated with a given VMA of the set of LRU VMAs are within a list of LRU physical memory pages maintained by the shared memory system; and responsive to the first stage failing to satisfy the total number of pages, perform a second stage of page reclamation identification by adding pages to the reclamation set from a remaining set of VMAs of the plurality of VMAs that exclude the LRU VMAs, wherein the remaining set of VMAs are prioritized based on their respective relative percentage of virtual memory pages corresponding to physical memory pages in the list.

Example 27 includes the subject matter of Example 26, wherein the first stage of page reclamation identification comprises while a size of the reclamation set is less than the total number of pages, for each VMA of the set of LRU VMAs: selecting a page for inclusion within the reclamation set by sequentially traversing physical memory pages associated with the VMA; and adding the selected page to the reclamation set.

Example 28 includes the subject matter of Examples 26-27, wherein the second stage of page reclamation identification comprises while the size of the reclamation set is less than the total number of pages, for each VMA of the remaining set of VMAs: identifying a maximum set of physical memory pages associated with the VMA that may be reclaimed without increasing a number of TLB entries of the set of TLB entries maintained for the VMA beyond a threshold; and adding the identified maximum set of physical memory pages to the reclamation set.

Example 29 includes the subject matter of Examples 26-28, wherein the indication of the total number of pages is received responsive to memory pressure associated with the shared memory system.

Example 30 includes the subject matter of Example 26-29, wherein the indication of the total number of pages is received during a defragmentation process performed by the shared memory system.

Some embodiments pertain to Example 31 that includes an apparatus that implements or performs a method of any of Examples 11-15.

Some embodiments pertain to Example 32 includes an apparatus comprising means for performing a method as claimed in any of Examples 11-15.

Some embodiments pertain to Example 33 that includes an apparatus that implements or performs a method of any of Examples 16-20.

Some embodiments pertain to Example 34 includes an apparatus comprising means for performing a method as claimed in any of Examples 16-20.

Some embodiments pertain to Example 35 that includes at least one machine-readable medium comprising a plurality of instructions, when executed on a computing device, implement or perform a method or realize an apparatus as described in any preceding Example.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory machine-readable medium storing instructions, which when executed by a processing resource of a monitor node of a shared memory system cause the shared memory system to:

determine whether migration of a set of one or more pages within a first continuous region of physical memory addresses of a physical address space from a source tier of memory to a target tier of memory, would break contiguity of a mapping maintained by a contiguity-aware translation lookaside buffer (TLB) between pages of the first contiguous region and a second contiguous region of a virtual memory area (VMA) corresponding to the first contiguous region; and responsive to an affirmative determination, minimize a number of discontinuities within the mapping resulting from the migration by (i) increasing the set by adding up to N pages of the first contiguous region to the set, or (ii) decreasing the set by removing up to M pages of the set from the set.

2. The non-transitory machine-readable medium of claim 1, wherein the instructions further cause the shared memory system to select between said increasing and decreasing based on the target tier of memory.

3. The non-transitory machine-readable medium of claim 1, wherein N represents a dynamically configurable or predetermined aggression factor and M represents a dynamically configurable or predetermined defensive factor.

4. The non-transitory machine-readable medium of claim 2, wherein the source tier of memory comprises a non-volatile memory in which cold data is stored, wherein the target tier of memory comprises a volatile memory in which hot data is stored, and wherein the migration represents a promotion of hot pages.

5. The non-transitory machine-readable medium of claim 2, wherein the shared memory system comprises a non-uniform memory access (NUMA) system, wherein the source tier of memory is associated with a remote node of the NUMA system, wherein the target tier of memory is associated with a local node of the NUMA system, and wherein the migration is part of a balancing of pages within the NUMA system.

6. A non-transitory machine-readable medium storing instructions, which when executed by a processing resource of a monitor node of a shared memory system cause the shared memory system to:

receive an indication of a total number of pages desired to be reclaimed from a plurality of virtual memory areas (VMAs) of the shared memory system, wherein a contiguity-aware translation lookaside buffer (TLB) maintains respective sets of TLB entries mapping contiguous regions of virtual memory pages of the plurality of VMAs to corresponding contiguous regions of physical memory pages;

perform a first stage of page reclamation identification by creating a reclamation set of pages based on a set of least-recently used (LRU) VMAs in which all physical memory pages associated with a given VMA of the set of LRU VMAs are within a list of LRU physical memory pages maintained by the shared memory system; and responsive to the first stage failing to satisfy the total number of pages, perform a second stage of page reclamation identification by adding pages to the reclamation set from a remaining set of VMAs of the plurality of VMAs that exclude the LRU VMAs, wherein the remaining set of VMAs are prioritized based on their respective relative percentage of virtual memory pages corresponding to physical memory pages in the list.

7. The non-transitory machine-readable medium of claim 6, wherein the first stage of page reclamation identification comprises while a size of the reclamation set is less than the total number of pages, for each VMA of the set of LRU VMAs:

selecting a page for inclusion within the reclamation set by sequentially traversing physical memory pages associated with the VMA; and adding the selected page to the reclamation set.

8. The non-transitory machine-readable medium of claim 6, wherein the second stage of page reclamation identification comprises while the size of the reclamation set is less than the total number of pages, for each VMA of the remaining set of VMAs:

identifying a maximum set of physical memory pages associated with the VMA that may be reclaimed without increasing a number of TLB entries of the set of TLB entries maintained for the VMA beyond a threshold; and adding the identified maximum set of physical memory pages to the reclamation set.

9. The non-transitory machine-readable medium of claim 6, wherein the indication of the total number of pages is received responsive to memory pressure associated with the shared memory system.

10. The non-transitory machine-readable medium of claim 6, wherein the indication of the total number of pages is received during a defragmentation process performed by the shared memory system.

11. A method comprising: receiving information regarding a set of one or more pages within a physical address space that have been identified for migration from a source tier of memory to a target tier of memory, wherein the physical address space comprises a first contiguous region of physical memory addresses, and wherein a virtual memory area (VMA) includes a second contiguous region of virtual memory addresses corresponding to the first contiguous region;

determining whether the migration would break contiguity of a mapping maintained by a contiguity-aware translation lookaside buffer (TLB) between pages of the first contiguous region and pages of the second contiguous region; and responsive to an affirmative determination, minimizing a number of discontinuities within the mapping resulting from the migration by (i) increasing the set by adding up to N pages of the first contiguous region to the set, or (ii) decreasing the set by removing up to M pages of the set from the set.

12. The method of claim 11, further comprising selecting between said increasing and decreasing based on the target tier of memory.

13. The method of claim 11, wherein N represents a dynamically configurable or predetermined aggression factor and M represents a dynamically configurable or predetermined defensive factor.

14. The method of claim 12, wherein the source tier of memory comprises a non-volatile memory in which cold data is stored, wherein the target tier of memory comprises a volatile memory in which hot data is stored, and wherein the migration represents a promotion of hot pages.

15. The method of claim 12, wherein the source tier of memory is associated with a remote node of a non-uniform memory access (NUMA) system, wherein the target tier of memory is associated with a local node of the NUMA system, and wherein the migration is part of a balancing of pages within the NUMA system.

16. A shared memory system comprising:
a processing resource; and
a machine-readable medium, coupled to the processing resource, having stored therein instructions, which when executed by the processing resource the shared memory system to:
receive an indication of a total number of pages desired to be reclaimed from a plurality of virtual memory areas (VMAs) of a shared memory system, wherein a contiguity-aware translation lookaside buffer (TLB) maintains respective sets of TLB entries mapping contiguous regions of virtual memory pages of the plurality of VMAs to corresponding contiguous regions of physical memory pages;
perform a first stage of page reclamation identification by creating a reclamation set of pages based on a set of least-recently used (LRU) VMAs in which all physical memory pages associated with a given VMA of the set of LRU VMAs are within a list of LRU physical memory pages maintained by the shared memory system; and
responsive to the first stage failing to satisfy the total number of pages, perform a second stage of page reclamation identification by adding pages to the reclamation set from a remaining set of VMAs of the plurality of VMAs that exclude the LRU VMAs, wherein the remaining set of VMAs are prioritized based on their respective relative percentage of virtual memory pages corresponding to physical memory pages in the list.

17. The shared memory system of claim 16, wherein the first stage of page reclamation identification comprises while a size of the reclamation set is less than the total number of pages, for each VMA of the set of LRU VMAs:
selecting a page for inclusion within the reclamation set by sequentially traversing physical memory pages associated with the VMA; and
adding the selected page to the reclamation set.

18. The shared memory system of claim 16, wherein the second stage of page reclamation identification comprises while the size of the reclamation set is less than the total number of pages, for each VMA of the remaining set of VMAs:
identifying a maximum set of physical memory pages associated with the VMA that may be reclaimed without increasing a number of TLB entries of the set of TLB entries maintained for the VMA beyond a threshold; and
adding the identified maximum set of physical memory pages to the reclamation set.

19. The shared memory system of claim 16, wherein the indication of the total number of pages is received responsive to memory pressure associated with the shared memory system.

20. The shared memory system of claim 16, wherein the indication of the total number of pages is received during a defragmentation process performed by the shared memory system.

* * * * *